United States Patent
Brosi

(10) Patent No.: US 7,143,464 B2
(45) Date of Patent: Dec. 5, 2006

(54) DEVICE FOR SUCKING OFF SPECIFIED SURFACE AREAS ON POWDER-COATED VEHICLE WHEELS

(75) Inventor: Jürgen Brosi, Beilstein (DE)

(73) Assignee: Eisenmann Maschinenbau KG (DE)

(*) Notice: Subject to any disclaimer, the term of this patent is extended or adjusted under 35 U.S.C. 154(b) by 623 days.

(21) Appl. No.: 10/690,231

(22) Filed: Oct. 21, 2003

(65) Prior Publication Data
US 2004/0148050 A1    Jul. 29, 2004

(30) Foreign Application Priority Data
Oct. 26, 2002   (DE) ............................. 102 49 999

(51) Int. Cl.
*A47L 5/00*     (2006.01)
*B05C 11/00*    (2006.01)
*B05C 11/02*    (2006.01)

(52) U.S. Cl. ............... 15/306.1; 15/309.2; 15/319; 118/663; 118/677; 118/713; 118/56; 118/305; 118/308; 118/326; 134/21; 134/45; 427/180

(58) Field of Classification Search .............. None
See application file for complete search history.

(56) References Cited

FOREIGN PATENT DOCUMENTS

| DE | 195 20 498 A1 | 12/1996 |
|----|---------------|---------|
| DE | 199 42 785 A1 | 3/2001 |
| JP | 2000033331 A * | 2/2000 |
| WO | WO 96/24462 | 8/1996 |

* cited by examiner

*Primary Examiner*—David Redding
(74) *Attorney, Agent, or Firm*—Factor & Lake, Ltd.

(57) ABSTRACT

When vehicle wheels are powder-coated with powder coating, those surfaces on which no coating is wanted are always also coated. To suck off the powder coating from these surface areas before it is baked in, a device which includes a conveyor system, an electronic camera and a suction station is used. The electronic camera records the axial and angular position of the vehicle wheels which pass it, and supplies corresponding data to a controller. After a certain time delay, this causes a suction head in the suction station to move, in such a way that it approaches the vehicle wheel with appropriate alignment of its axis and angular position, and using suction nozzles sucks off those surfaces of the vehicle wheel on which the powder coating is not wanted. During the suction process, the suction head moves together with the vehicle wheel, at the same speed.

17 Claims, 2 Drawing Sheets

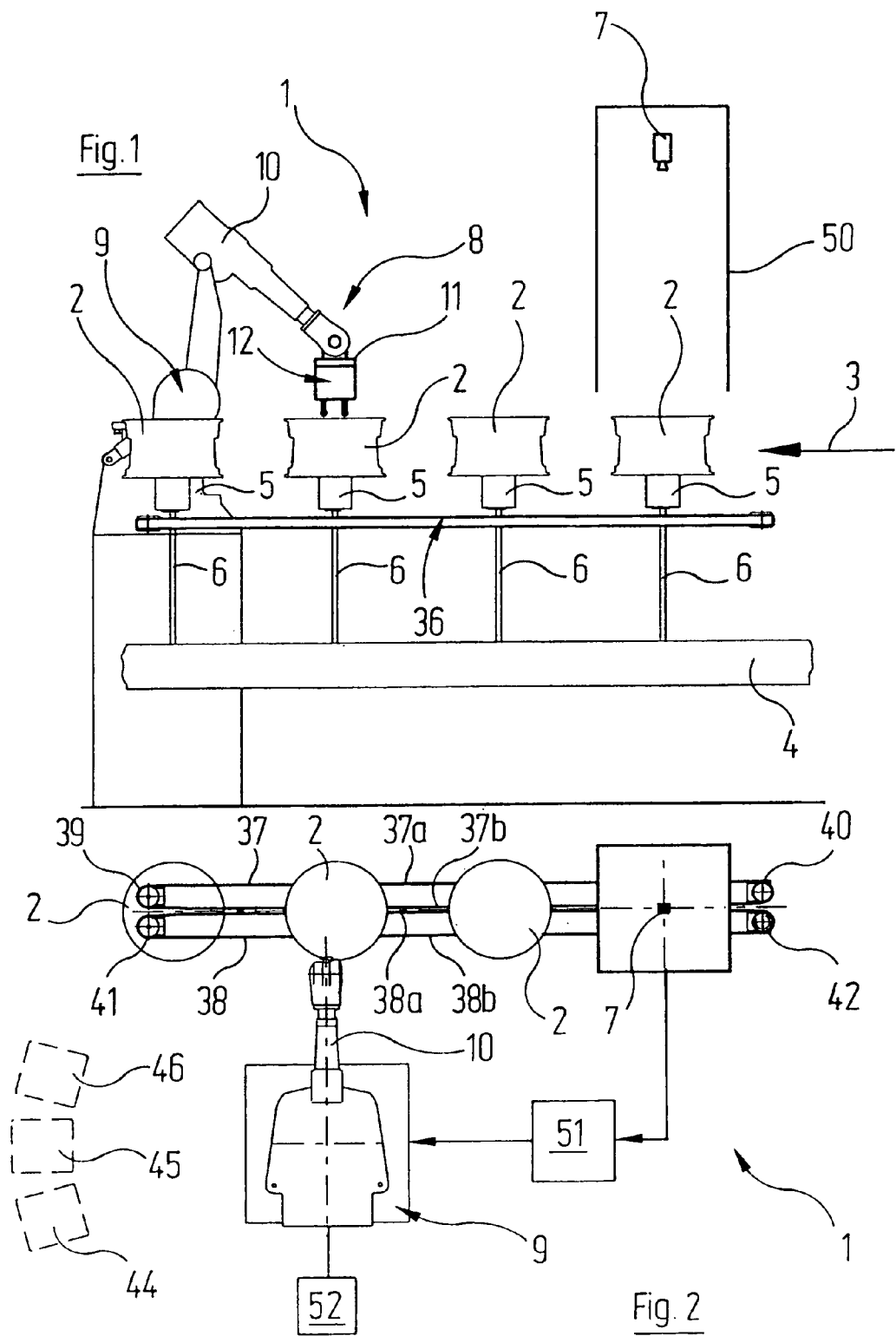

DEVICE FOR SUCKING OFF SPECIFIED SURFACE AREAS ON POWDER-COATED VEHICLE WHEELS

BACKGROUND OF THE INVENTION

The invention concerns a device for sucking off specified surface areas on powder-coated vehicle wheels.

Vehicle wheels, particularly light metal wheels, are today mainly powder-coated. First, in a powder-coating station, the appropriately prepared wheels are coated with powder coating, which is then baked in in a baking oven. It is generally unavoidable that during the powder-coating process all those surfaces of the vehicle wheels which face the device which applies the powder are coated with powder coating. However, this is not wanted, because certain surfaces, particularly the ring surfaces which surround the fixing holes and the surface of the hub hole, should remain uncoated as far as possible.

Until now, therefore, the appropriate surfaces have been freed of the powder coating by manual work. Alternatively, the vehicle wheels are masked appropriately before they enter the powder-coating station, for instance by inserting balls in the fixing holes of the vehicle wheels. However, this masking process, like the later removal of the mask after the coating with powder, had to be carried out as time-consuming and therefore expensive manual work.

SUMMARY OF THE INVENTION

The object of this invention is to create a device using which, after the vehicle wheels have been coated with powder, powder can be removed fully automatically from those areas of the surface on which a coating is not wanted.

According to the invention, this object is achieved in that the device includes:
  a) a conveyor system, which carries the vehicle wheels along a movement path through the device;
  b) an electronic camera, using which the axial and angular position of the vehicle wheels can be recorded in a recording station;
  c) a suction station with a movable suction head, which includes multiple suction nozzles;
  d) a movement device, which is capable of guiding the suction head in various axial orientations and angular positions around its axis onto the powder-coated surface of a vehicle wheel in the suction station, and of moving it a certain distance in this position at the speed of the vehicle wheel;
  e) a vacuum source, which is connected to the suction nozzles;
  f) a controller, which passes on the data which is determined in the recording station for the axial and angular position of a particular vehicle wheel to the movement device of the suction head, with a time delay corresponding to the pass time of the vehicle wheel between the recording station and the suction station, and causes the movement device to guide the suction head onto the vehicle wheel with appropriate alignment of its axis and angular position, and to move with it over a certain distance.

According to the invention, therefore, the vehicle wheels which come out of the powder-coating station are continuously guided through a fully automatic device, in which first, using an electronic camera, the precise axial orientation of the individual wheels and the angular position of the wheels around their axis are determined. The data which is determined in this way is fed to a controller, which in turn controls the movement of a suction head. This suction head is brought to an orientation and angular position corresponding to the previously determined axial orientation and angular position of the corresponding vehicle wheel. The suction head receives from the controller the command to approach the vehicle wheel, with a time delay corresponding to the pass time of the vehicle wheel between the recording station and the suction station. The assignment between the vehicle wheel and the data which is captured for it is retained, on the "first in-first out" principle.

During the suction process, the suction head moves for a certain time together with the vehicle wheel, so that this does not have to be held. With the device according to the invention, manual intervention to remove undesired areas of powder coating is not required.

The conveyor system which moves the vehicle wheels through the device according to the invention can agree with those in the upstream and downstream stations of the coating system.

The movement device is usefully a robot with a corresponding number of axes, and the suction head is fixed to the end of the robot arm. Suitable robots are obtainable on the market, and therefore do not have to be specially designed for the device according to the invention.

On the device according to the invention, vehicle wheels of various types can be processed, if it includes a number of replaceable suction heads which are each assigned to the different types of vehicle wheels.

In this connection, it is recommended that the electronic camera in the recording station should also be capable of recognising the type of vehicle wheel and outputting a corresponding signal to the controller.

It is specially advantageous if the suction heads are fixed to the robot arm via a tool exchange system. Such tool exchange systems are known. They make it possible to exchange the suction head quickly if a new type of vehicle wheel is to be processed.

For each suction head, a deposit area can be provided within reach of the robot arm. The suction head can then also be replaced fully automatically by the robot arm moving to one of the deposit areas, putting down the suction head which has been used until now, and then moving to another deposit area and picking up the suction head which is required for further processing.

The conveyor device can include a chain conveyor. This is advantageous because in general chain conveyors are also used in the powder-coating station upstream from the device according to the invention and the station downstream from the device according to the invention, so that a uniform conveyor device can run through all these stations.

The vehicle wheels are usefully placed on spindles, which are fixed to the conveyor device and can be rotated around their own axis. However, in general the advantages of this ability to rotate benefit the powder-coating station upstream from the device according to the invention, where the application of the powder coating is simplified by the ability of the vehicle wheels to rotate.

The traditional conveyor devices in coating systems, which as stated above should preferably also be routed through the device according to the invention, must be implemented in relatively robust form. They therefore sometimes have a certain play. In this case, in a recommended embodiment of the invention, as well as the conveyor device a synchronisation device is provided on the route section between the recording station and the suction station, and absorbs any play in the conveyor device and ensures a precisely defined speed of the vehicle wheels. This avoids the position of the vehicle wheels in the suction station differing from the position which was calculated according to the data which was determined in the recording station.

The synchronisation device can, for instance, include two endless loops, the strands of which extend parallel to the movement path of the vehicle wheels, the spindles being clamped between the inner strands.

For safety reasons, it is advantageous if the suction nozzles are implemented on a nozzle unit which is arranged so that it can be moved within the suction head and is pressed by a spring device into a position in which the suction nozzles project above the suction head to the maximum extent. If the suction head is not guided precisely onto the vehicle wheel, the nozzle device therefore springs back, so that damage to the suction head or vehicle wheel can be avoided.

A sensor, which outputs an alarm signal to the controller if the nozzle unit is moved further than a predefined distance against the force of the spring device, can be provided. On this alarm signal, the controller pulls the suction head away from the vehicle wheel. The device can be stopped and the operating personnel can be made aware of the fault.

The suction head can have multiple suction nozzles, which are arranged at the same radial distance from the axis of the suction head and are used to suck off the ring surfaces which surround the openings of the fixing holes of the vehicle wheel.

Additionally, the suction head can have a ring nozzle which is coaxial to its axis, and is used to suck off the surfaces of the vehicle wheel.

As the vacuum source, an industrial vacuum cleaner, which is commercially obtainable and relatively inexpensive, is recommended.

In a specially preferred embodiment of the invention, the spindles each have a spindle head with a centring cone. The centring cone has a piston-like section which is guided movably in a hole of the spindle head and affected by a spring device, and a projecting conical section which is guided through a hole on the upper side of the spindle head. As the suction head approaches the vehicle wheel, the conical section comes into contact with part of the suction head, so that the centring cone is pushed back in the spindle head hole against the force of the spring device, and a gap is freed between the conical section of the centring cone and the hole in the upper side of the spindle head.

The centring cone is used first, as its name implies, to center the suction head as it approaches the vehicle wheel. Additionally, pushing back the centring cone opens a flow path though which air can flow when the hub hole of the vehicle wheel is sucked off and thus support the suction process.

BRIEF DESCRIPTION OF THE DRAWINGS

An embodiment of the invention is explained below on the basis of the drawings.

FIG. 1 shows a side view of a device for sucking off powder-coated aluminium wheels;

FIG. 2 shows the plan view of the device of FIG. 1;

DETAILED DESCRIPTION OF THE DRAWINGS

Figure 3:
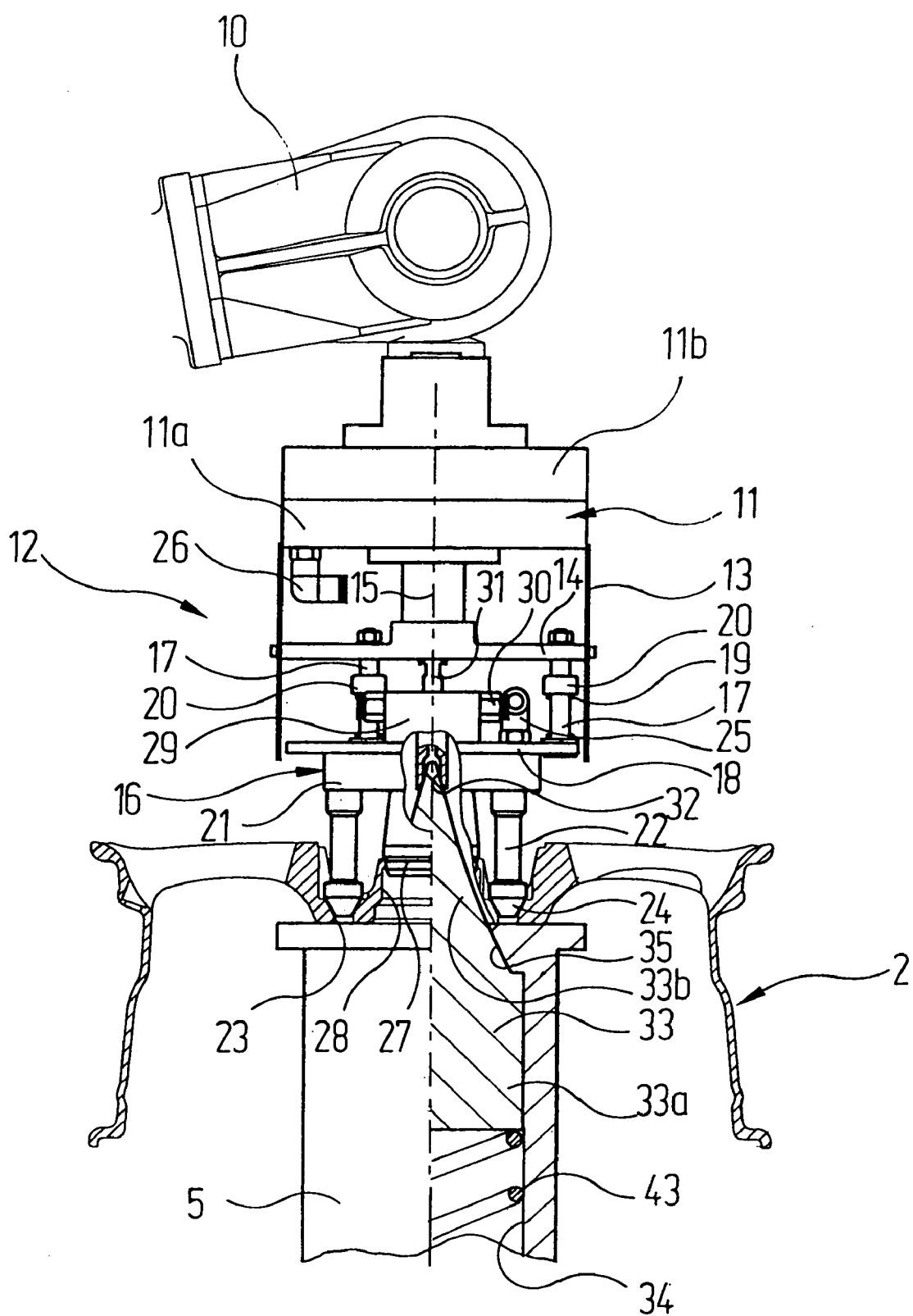
FIG. 3 shows a partial enlargement in the area of the suction station of the device of FIG. 1, partly in section.

The device which is shown in FIGS. 1 and 2 and in total identified by the reference symbol 1 is used to suck off automatically aluminium wheels 2 which have previously been coated with powder coating in a powder-coating station, in those areas in which a coating is not wanted. These areas are, in particular, conically extending end areas of the fixing holes 23, and the area of the hub hole 28 (see FIG. 3). The aluminium wheels 2 are guided from the powder-coating station (not shown) to the suction device 1 in the direction of the arrow 3 in FIG. 1, using a schematically indicated chain conveyor 4, and in normal operation transported through at continuous speed. The aluminium wheels 2, as shown in FIG. 3, lie on the upper side of a spindle head 5, which is carried by a vertically running spindle 6 which can be rotated around its own axis. The spindle 6 itself is fixed to the chain conveyor 4. As FIG. 1 shows, multiple spindles 6 carrying aluminium wheels 2, with associated spindle heads 5, follow each other at regular intervals.

The aluminium wheels 2 which are guided in the direction of the arrow 3 first reach a recording station 50 and then the viewing field of a CCD camera 7. This records the type of the aluminium wheel 2 which passes underneath it, and ascertains the precise axial orientation and angular position of this aluminium wheel 2.

The aluminium wheels 2 go on, moved by the chain conveyor 4, to a suction station, which is identified as a whole in the drawing by the reference symbol 8. The suction station 8 includes a robot 9, which as shown in FIG. 2 is set up on the floor next to the movement path of the aluminium wheels 2 and has a robot arm 10. The end of the robot arm 10 carries a tool exchange system 11. Its construction agrees with common tool exchange systems which are used with machine tools, and allows quick tool exchange and has suitable coupling devices. These coupling devices include, in this case, couplings for a vacuum line, as is explained below. This vacuum line runs through the robot arm 10 and leads to an industrial vacuum cleaner 52, which is shown in FIG. 2 and is used as the vacuum source and the collecting filter for the powder which is sucked off from the aluminium wheels 2.

The suction station 8 also includes a suction head 12, which is attached to the end of the robot arm 10 with the help of the tool exchange system 11, and is shown in FIG. 3 at a larger scale and partly in section.

The suction head 12 has a cylindrical housing 13, which is joined to a circular supporting plate 14 which crosses the housing 13 at approximately half height. This is fixed via a rigid rod 15 to the removable part 11a of the tool exchange system 11. The supporting plate 14 thus makes all the movements of the tool exchange system 11.

From the supporting plate 14, a nozzle unit 16 is suspended by three axially parallel guide columns 17, which are set at an angle of 120° to each other, and of which two can be seen in FIG. 3. For this purpose, the nozzle unit 16 has a plate 18 which runs parallel to the supporting plate 14, and has holes through which the guide columns 17 run. Using springs 19, which surround a part of the guide columns 17 coaxially and are each braced between a sleeve 20 which is attached to the guide column 17 and the upper side of the plate 18, the plate 18 is pressed down as far as possible against limit stops which are carried on the end of the guide columns 17. The arrangement is therefore such that the plate 18 and thus the whole nozzle unit 16 can be pushed upward by a force which acts from below against the force of the springs 19, parallel to itself or with a certain tilt.

The plate 18 of the nozzle unit 16 carries on its underside a first air distributor ring 21, which contains a ring-shaped hollow space which is not visible in the drawing. From the air distributor ring 21, several suction nozzles 22 extend downward and axially parallel. The number of suction nozzles 22 and their geometrical arrangement, particularly their axial distance and mutual angular distances, agree with the arrangement of fixing holes 23 in the aluminium wheel 2. The suction nozzles 22 carry on their ends nozzle heads 24, which are skewed conically at their ends so that the suction nozzles 22 can center themselves in the corresponding conical end parts of the fixing holes 23.

The suction channels (not visible in the drawing) which run axially through the suction nozzles 22 end at the ring-shaped hollow space within the air distributor ring 21.

The plate 18 of the nozzle unit 16 carries on its upper side multiple hose connectors 25, of which only one is shown in FIG. 3, and which communicate with the ring-shaped hollow space within the air distributor ring 21. These hose connectors 25 are connected via hoses, which for simplicity are not shown in FIG. 3, and which cross the supporting plate 14 in suitable recesses, to hose connectors 26, which are attached to the underside of the removable part 11a of the tool exchange system 11, and of which only one can be seen in FIG. 3.

On the underside of the supporting plate 14, a cylindrical rod 31 is fixed, and is aligned coaxially to the fixing rod 15 which holds the supporting plate 14. The rod 31 has on its underside a ring nozzle 27, the diameter of which corresponds to the diameter of the hub hole 28 of the aluminium wheel 2. The ring-shaped suction gap (not visible in FIG. 3) of the ring nozzle 27 communicates with the inner space of a second, hollow air distributor ring 29, which is bolted onto the ring nozzle 27. The inner space of the air distributor ring 29 is itself connected to radially arranged hose connectors 30, which themselves in turn are connected via hoses (not shown) to one of the hose connectors 26 on the removable part 11a of the tool exchange system 11.

The rod 31 crosses the air distributor ring 29 and a hole in the supporting plate 18, and partly the lower air distributor ring 21. At its lower end, the guide rod 31 has a receptacle 32, which in the position, shown in FIG. 3, of the suction head 12, in the working position on the aluminium wheel 2, receives the upward pointing tip of a centring cone 33. The centring cone 33 has a piston-shaped cylindrical part 33a which is guided within an axially parallel hole 34 of the spindle head 5, and an upper conical area 33b, which is guided through a circular hole 35 in the upper side of the spindle head 5.

A spring 43 which is braced between the lower side of the centring cone 33 and the floor of the hole 34 in the spindle head 5 presses the centring cone 33 upward, normally as far as the rest on the upper wall of the cylinder head 5.

The hose connectors 26 on the removable part 11a of the tool exchange system 11 are connected, in a way which is not shown here, to the above-mentioned coupling for the vacuum line. The coupling has a counterpart in that part 11b of the tool exchange system 11 which is fixed to the robot arm 10.

In the area in which the aluminium wheels 2 pass through the suction device 1, that is beginning shortly before the recording station 50 in which the aluminium wheels 2 are recorded by the CCD camera 7, to beyond the point at which the suction process is completed, along the movement path of the aluminium wheels 2, parallel to and above the chain conveyor 4, a synchronisation device 36 runs. The purpose of this synchronisation device 36 is to eliminate any play which the spindles 6 have on the chain conveyor 4, so that the position of the aluminium wheels 2 cannot change between the point at which they are recorded by the CCD camera 7 and the point at which the suction process takes place.

The synchronisation device 36 includes, as can be seen, in particular, in FIG. 2, two endless loops 37, 38, each of which has a straight inner strand 37a or 38a, which runs parallel to the direction of movement 3, and an outer strand 37b, 38b. The endless loops 37, 38 are each guided over two deflection pulleys 39, 40 and 41, 42, one of which is driven in each case. By electronic interconnection of the drive source of the chain conveyor 4 to the drive source of the endless loops 37, 38 in master and slave style, absolute synchronisation of the endless loops 37, 38 to the chain conveyor 4 is achieved. The two inner strands 37a, 38b of the endless loops 37, 38 rest in the upper part on the spindles 6 and clamp them in, so that the position of the spindles 6 in the conveying direction 3 is always precisely defined.

The suction device 1 described above works as follows:

Using the chain conveyor 4, the aluminium wheels 2, freshly coated with powder coating, are brought. The aluminium wheels 2 are coated with powder coating even on areas on which no coating is wanted. These areas are, in particular, the boundary wall of the hub hole 28 and the outward-facing ring surfaces which surround the fixing holes 23.

Before an aluminium wheel 2 enters the recording area of the CCD camera 7, the associated spindle 6 runs between the inner strands 37a, 38a of the synchronisation device 36, so that further movement is now highly defined.

During the pass under the CCD camera 7, it not only ascertains the type of the passing aluminium wheel 2, but also its axial position and the angular position of the fixing holes 23. This data is fed to a controller 51, which is shown schematically in FIG. 2. The controller 51 passes on the data in question to the robot 10 with a time delay corresponding to the pass time of the aluminium wheels 2 between the recording position below the CCD camera 7 and a position near the robot.

When the aluminium wheel 2 in question arrives at the last-mentioned position, the robot 9 thus knows what wheel type is involved and in what position the aluminium wheel 2 is. It first tests whether the suction head 12, which is fixed to the end of the robot arm 10, corresponds to the wheel type in question. If not, replacement of the suction head 12 must be initiated. This is described in more detail below. If the wheel type which the CCD camera 7 reads out agrees with the suction head 12, the suction head 12 is accelerated, using the robot 9, to a linear speed corresponding to the speed of movement of the aluminium wheels 2. Simultaneously, the axis of the suction head 12 is aligned corresponding to the determined axial position of the aluminium wheel 2, and the rotary position of the suction head 12 is changed so that the various suction nozzles 22 which project from its lower side are aligned to the fixing holes 23 of the aluminium wheel 2. When this is the case, the suction head 12 is lowered onto the vehicle wheel 2. The conically running nozzle heads 24 of the suction nozzles 22 penetrate into the fixing holes 23. However, before any contact between the nozzle heads 24 and the surfaces of the fixing holes 22 takes place, the surroundings of the fixing holes 23 on the upper face of the vehicle wheel 2 are sucked off in a ring using the suction nozzles 22.

Approximately simultaneously, the ring nozzle 27 on the lower side of the suction head 12 penetrates the hub hole 28. Here too, the suction of the powder is essentially completed when physical contact between the ring nozzle 27 and the wall of the hub hole 28 takes place.

During the suction process, that is before the nozzle heads 24 are in contact with the fixing holes 23 and the ring nozzle 27 is in contact with the hub hole 28, the tip of the centring cone 33 engages with the receptacle 32 of the guide rod 31 on the suction head 12. As the suction head 12 moves further in the direction towards the aluminium wheel 2, the centring cone 33 is pressed downward against the effect of the spring 43. In this way, between the hole 35 in the upper side of the spindle head 5 and the conical part 33b of the centring cone 33, a ring gap opens, and air can pass upward through it from below, that is from the hole 34 in the spindle head 5, and flow through the hub hole 28. This flowing air supports the sucking free of the hub hole 28.

When the suction process, in which the suction head 12, guided by the robot arm 10, constantly follows the continuous, even movement of the aluminium wheels 2, is concluded, the robot 9 removes the suction head 12 from the aluminium wheel 2. The aluminium wheel 2 now leaves the area in which the synchronisation device 36 is effective, and is passed on to another part of the plant, for instance a baking oven.

Because of the sprung bedding of the nozzle unit 16 against the nozzle head 12, damage to the aluminium wheel 2 and/or the suction head 12 can be avoided if the nozzle heads 24 or ring nozzle 27 come into contact with the walls of the fixing holes 23 and/or the hub hole 28 of the aluminium wheel 2. Along the movement path of the nozzle unit 16, a sensor (not shown) is arranged. If this ascertains that the nozzle unit 16 has been pushed upward by a distance which exceeds a specified maximum value, the robot 9, on a command from the controller 51, lifts the suction head 12 away from the aluminium wheel 2. In this case, an alarm signal is generated.

As FIG. 2 shows, multiple deposit positions 44 to 46, on which suitable suction heads 12 for different wheel types can be deposited, are provided within reach of the robot arm 10. If the CCD camera 7 ascertains that the aluminium wheel 2 which passes underneath it belongs to a different type from the suction head 12 which is currently fixed to the end of the robot arm 10, the robot 9 receives from the controller the command to deposit the suction head 12 which is mounted on it on the deposit position 44, 45, 46 which is assigned to it, and to take the suitable suction head 12 for the newly arriving wheel type from the corresponding deposit position 44, 45, 46. The robot 9 then moves the newly picked up suction head 12 back into the working position on the movement path of the aluminium wheels 2. Since depositing the suction head 12 which is no longer required and picking up the new one requires a certain time, in this case there must be a minimum gap between the last aluminium wheel 2, which was sucked off using the first suction head 12, and the first aluminium wheel 2 of the new type, which is to be sucked off using the second suction head 12.

The minimum gap between successive aluminium wheels 2 of different types, at a given speed of movement of the aluminium wheels 2, must therefore correspond to the time which is required for replacing the suction head 12.

The foregoing description merely explains and illustrates the invention and the invention is not limited thereto except insofar as the appended claims are so limited, as those having skill in the art who have the disclosure before them will be able to make modifications without departing from the scope of the invention.

What is claimed is:

1. Device for sucking off specified surface areas on powder-coated vehicle wheels, characterized in that it includes:

a) a conveyor system, which carries the vehicle wheels along a movement path through the device;
  b) an electronic camera, using which an axial and an angular position of the vehicle wheels can be recorded in a recording station;
  c) a suction station with a movable suction head, which includes multiple suction nozzles;
  d) a movement device, which is capable of guiding the suction head in various axial orientations and angular positions around an axis of the movement device and onto the powder-coated surface of a vehicle wheel in the suction station, and of moving it a certain distance in this position at the speed of the vehicle wheel;
  e) a vacuum source, which is connected to the suction nozzles;
  f) a controller, which passes on the data which is recorded in the recording station for the axial and angular position of a particular vehicle wheel to the movement device of the suction head, with a time delay corresponding to the pass time of the vehicle wheel between the recording station and the suction station, wherein the controller causes the movement device to guide the suction head onto the vehicle wheel with appropriate alignment of its axis and angular position, and to move with the wheel over a certain distance.

2. Device according to claim 1, wherein the movement device is a robot with a corresponding number of axes, and the suction head is fixed to the end of a robot arm.

3. Device according to claim 1, wherein the device includes a number of replaceable suction heads which are each assigned to different types of vehicle wheels.

4. Device according to claim 3, wherein the electronic camera is also capable of recognising the type of vehicle wheel which it records.

5. Device according to claim 3, wherein the movement device is a robot with a corresponding number of axes, and the suction heads can be fixed to a robot arm via a tool exchange system.

6. Device according to claim 5, wherein for each suction head, a deposit area is provided within reach of the robot arm.

7. Device according to claim 1, wherein the conveyor device includes a chain conveyor.

8. Device according to claim 1, wherein the vehicle wheels can be placed on spindles, which are in turn fixed to the conveyor device and can be rotated around their own axis.

9. Device according to claim 1, wherein a synchronisation device is provided on the route section between the recording station and the suction station, which absorbs any play in the conveyor device and ensures a precisely defined speed of the vehicle wheels.

10. Device according to claim 9, wherein the synchronisation device includes two endless loops, having strands that extend parallel to the movement path of the vehicle wheels.

11. Device according to claim 10, wherein the vehicle wheels can be placed on spindles, and the strands having at least inner strands and outer strands the spindles being clamped between the inner strands.

12. Device according to claim 1, wherein the suction nozzles are implemented on a nozzle unit which is arranged so that it can be moved within the suction head and is pressed by a spring device into a position in which the suction nozzles project above the suction head to the maximum extent.

13. Device according to claim 12, wherein a sensor is provided, which outputs an alarm signal to the controller if the nozzle unit is moved further than a predefined distance against the spring device.

14. Device according to claim 1, wherein the suction head has multiple suction nozzles, which are arranged at an identical radial distance from an axis of the suction head and are used to suck off ring surfaces which surround openings of fixing holes of the vehicle wheel.

15. Device according to claim 1, wherein the suction head has a ring nozzle which is coaxial to an axis of the suction head, and is used to suck off surfaces of a hub hole of the vehicle wheel.

16. Device according to claim 1, wherein the vacuum source is an industrial vacuum cleaner.

17. Device according to claim 8, wherein the spindles each have a spindle head with a centring cone, the centring cone having a piston-like section which is guided movably in a hole of the spindle head and is affected by a spring device, and a projecting conical section which is guided through a hole on the upper side of the spindle head, which conical section, as the suction head approaches the vehicle wheel, comes into contact with part of the suction head, so that a centring cone is pushed back in the hole of the spindle head against the spring device, and a gap is freed between the conical section of the centring cone and the hole in the upper side of the spindle head.

* * * * *